(12) United States Patent
Goodman et al.

(10) Patent No.: US 7,997,423 B2
(45) Date of Patent: Aug. 16, 2011

(54) CONTAINER FOR STORING A LIQUID SUCH AS COOKING OIL

(76) Inventors: David Goodman, Mt. Washington, KY (US); John R. Howard, Northwoods, IL (US); Robert W. Machacek, Lombard, IL (US)

( * ) Notice: Subject to any disclaimer, the term of this patent is extended or adjusted under 35 U.S.C. 154(b) by 68 days.

(21) Appl. No.: 11/507,171

(22) Filed: Aug. 21, 2006

(65) Prior Publication Data

US 2008/0041781 A1 Feb. 21, 2008

(51) Int. Cl.
*B01D 27/00* (2006.01)
*B01D 35/00* (2006.01)
*B01D 29/88* (2006.01)
*B01D 35/28* (2006.01)

(52) U.S. Cl. ........ 210/473; 210/464; 210/465; 210/477; 210/469; 210/474; 210/451; 210/455; 210/479

(58) Field of Classification Search .......... None
See application file for complete search history.

(56) References Cited

U.S. PATENT DOCUMENTS

| 2,885,290 | A | * | 5/1959 | Krasker | 99/306 |
|---|---|---|---|---|---|
| 3,446,624 | A | * | 5/1969 | Luedtke | 426/77 |
| 4,446,158 | A | * | 5/1984 | English et al. | 426/79 |
| 5,738,786 | A | * | 4/1998 | Winnington-Ingram | 210/474 |
| 5,813,317 | A | * | 9/1998 | Chang | 99/285 |
| 5,942,143 | A | * | 8/1999 | Hartman et al. | 219/689 |
| 5,993,675 | A | * | 11/1999 | Hagerthy | 210/799 |
| 6,033,455 | A | * | 3/2000 | Kurashima | 55/497 |
| 6,117,319 | A | * | 9/2000 | Cranshaw | 210/232 |
| 6,561,080 | B1 | * | 5/2003 | Feeney | 99/319 |
| 6,623,634 | B1 | * | 9/2003 | Whitehurst | 210/186 |
| 2003/0057148 | A1 | * | 3/2003 | Zuk, Jr. | 210/445 |

* cited by examiner

*Primary Examiner* — Benjamin Kurtz
(74) *Attorney, Agent, or Firm* — Robert L. Marsh

(57) ABSTRACT

A cooking oil container has a filter cup retained at the upper end thereof. The filter cup retains a planar circular filter at the lower end and a seal between the filter holder and the bottom of the filter cup prevents oil from overflowing around the circumference of the filter holder to avoid the filter. The filter cup is spaced from the inner walls of the container to allow air to escape from the bottom of the container. The top of the container has a grip ring and the inverted top is useable as a drip tray for the filter cup while oil is being poured out of the container.

8 Claims, 14 Drawing Sheets

CONTAINER FOR STORING A LIQUID SUCH AS COOKING OIL

The present invention relates to a container or canister for storing cooking oil and the like having an improved filter cup for removably retaining a filter and an improved lid.

BACKGROUND OF THE INVENTION

Cooking oil is a reusable, difficult to handle, liquid needed for cooking various types of foods. When purchased, the liquid is typically marketed in disposable one gallon or one quart containers with a relatively small opening through which the liquid is poured as it is needed. Once the cooking of the food is completed, the cooking oil can be restored and used on another occasion. The containers used to market the cooking oil, however, have relatively small openings and a funnel must be used if the cooking oil is to be returned to the original container. But, the refilled cooking oil retainer is a relatively unattractive element in a kitchen and therefore, someone who desires to make frequent use of cooking oil would prefer to retain the oil in a more attractive container. Preferably, the container would not be transparent so that the liquid within the container would not be visible, and the container would be sufficiently attractive so that it could be left on a counter where the cooking oil therein would be readily available for reuse.

It is also desirable that the cooking oil be strained or filtered after each use because small particles of food become suspended in the oil during the cooking process. Unless the particles have been filtered out of the oil, the oil rapidly becomes opaque in appearance and the particles may impart an undesirable flavor to subsequent foods being cooked in the oil.

Prior efforts have been made to market cooking oil retainers having filters therein but such prior containers have failed to become a standard fixture in a kitchen. There is therefore a need for an improved container for retaining cooking oil that has an attractive appearance, can easily be cleaned, and is suitable for filtering and storing used cooking oils.

SUMMARY OF THE INVENTION

Briefly, the present invention is embodied in a container for storing liquids that includes a tubular canister having a closed bottom. Preferably, the canister is made of an attractive metal such as stainless steel. During normal usage, the longitudinal axis of the canister is oriented vertically with the open end of the canister extending upwardly and an attractive removable cap is fitted across the upper end of the canister.

Fitted into the open upper end of the canister and below the removable cap is a tubular filter cup having an annular radially extending flange around the upper edge of the filter cup that engages the upper rim of the canister to retain the filter cup from falling into the lower portion of the canister. The lower end of the tubular filter cup has an annular inner edge and an annular outer edge with a relatively planar lower surface extending between the inner edge and outer edge. An annular ridge is positioned on the planar surface spaced between the inner edge and the outer edge and a male threading extends around the outer circumference of the filter cup near the lower end.

An annular filter retainer having an upwardly facing annular planar surface complementary to the planar surface of the filter cup has female threadings complementary to the male threadings of the filter cup for retaining the retainer thereto. The planar annular surface of the filter retainer also has a upwardly directed annular ridge around the circumference thereof with the annular ridge of the retainer having a different diameter than the annular downwardly facing ridge on the bottom surface of the filter cup. A planar circular mesh filter is positioned between the lower surface of the filter cup and the upwardly directed surface of the filter retainer and the outer end of the circular retainer is retained between the upper and lower surfaces of the filter cup and retainer in place by an undulating surface formed by the downwardly directed annular ridge of the filter cup and the upwardly directed annular ridge of the retainer. The liquid container of the invention, therefore, includes a filter cup with a readily replaceable filter.

Another feature of the invention is that the filter cup has an annular compressible seal between the lower end of the filter cup and the retainer for preventing the liquid above the filter from overflowing through the threads retaining the retainer to the filter cup. The compressible seal may have any of several embodiments, but in the preferred embodiment the seal is in the form of an outwardly directed tapered annular flange mold around the circumference of the filter cup. The annular flange has a frustoconical surface and a planar surface such that the flange is wedge shaped in cross-section. Preferably, the annular flange extends around the lower end of the filter cup adjacent the threads and is contacted by an annular shoulder in the filter retainer. When the retainer is tightly threaded against the lower end of the filter cup, the shoulder of the retainer compresses against the wedge shaped annular ridge deflecting the ridge and providing a seal between the ridge and the inner surface of the retainer.

In a second embodiment of a seal, an O-ring can be positioned around the outer circumference of the lower end of the filter cup and the inner circumference of the filter retainer. Alternately, an annular planar gasket can be positioned between the parts to seal them against leakage.

Another feature of the invention is that the annular ridge around the upper end of the filter cup has a plurality of downwardly extending spacers that space the annular upper ridge from the upper rim of the container. The spacers form a gap between the outer edge of the filter cup and the inner wall of the canister to allow the escape of air as liquid, which accumulates above the filter in the filter cup, drains into the body of the canister. In the absence of an air release, air will be trapped within the lower end of the canister by oil in the filter cup and will impede the flow of oil through the filter.

The canister of the present invention also has an improved cap. Preferably, the cap includes a stainless steel metal top that extends across the upper end of the canister with the top having an annular downwardly extending flange. The downwardly extending annular flange is received by an annular plastic part including an inner tubular portion, that extends around the inner circumference of the flange, and an outer tubular portion that extends around the outer circumference of the flange. The inner tubular portion includes female threadings for threading around male threadings at the upper end of the canister lip. The outer tubular portion has a grip band adapted to be easily grasped by the human hand. The annular plastic part, including the inner tubular portion and the outer tubular portion, is preferably made of molded plastic as a unitary part.

Another feature of the invention is that the inner tubular portion of the cap defines an annular flange around a planar surface with the inner circumference of the flange having a diameter that is greater than the outer diameter of the lower end of the filter retainer. The filter cup can therefore be placed on the inside of the cap when the cap is inverted on a counter.

The cap then becomes a drip cup for the filter when the filter is withdrawn from the canister to allow the contents of the canister to be emptied.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENT

Figure 1:
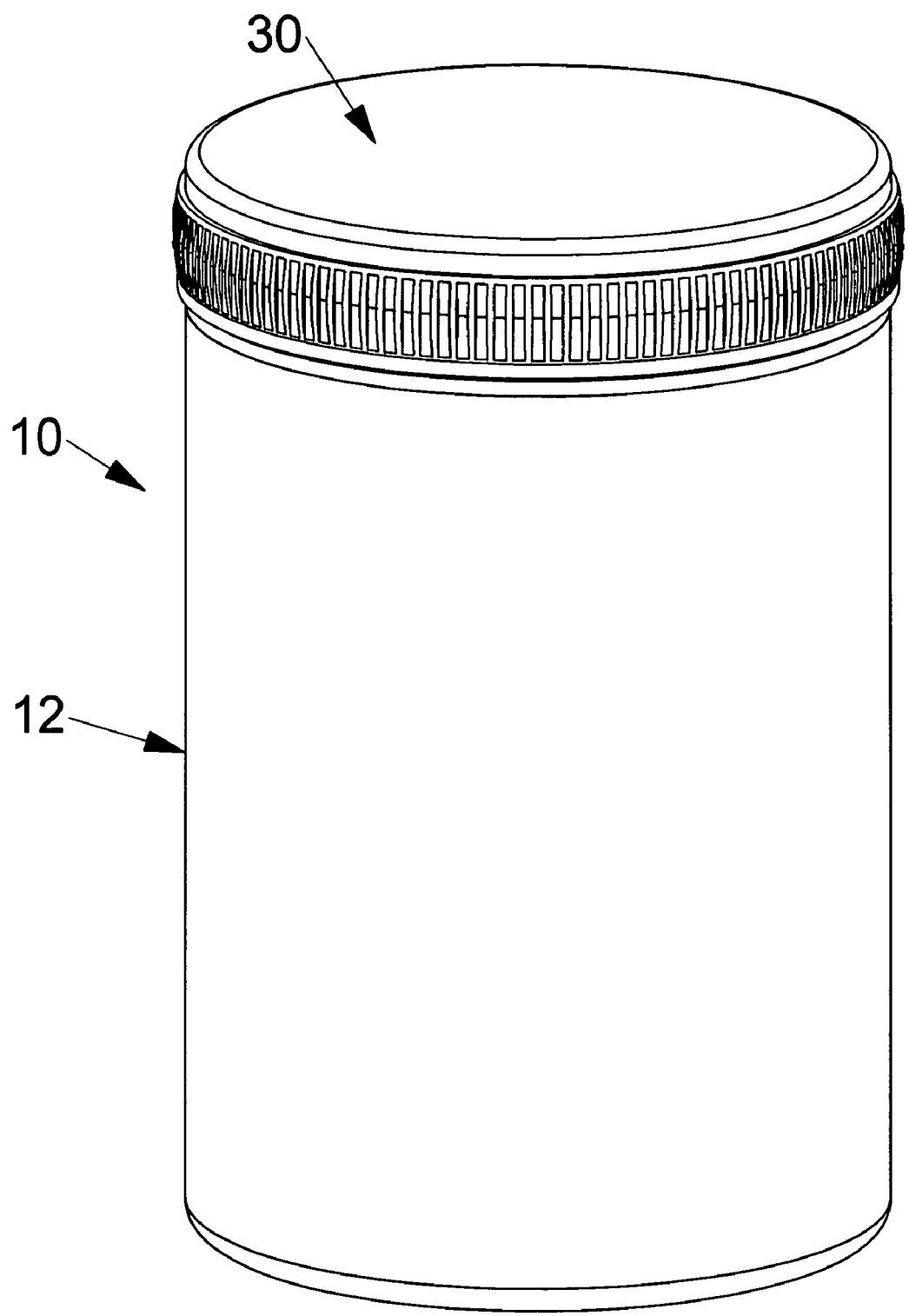
FIG. 1 is an isometric view of a canister for retaining cooking oil in accordance with the present invention.
Figure 2:
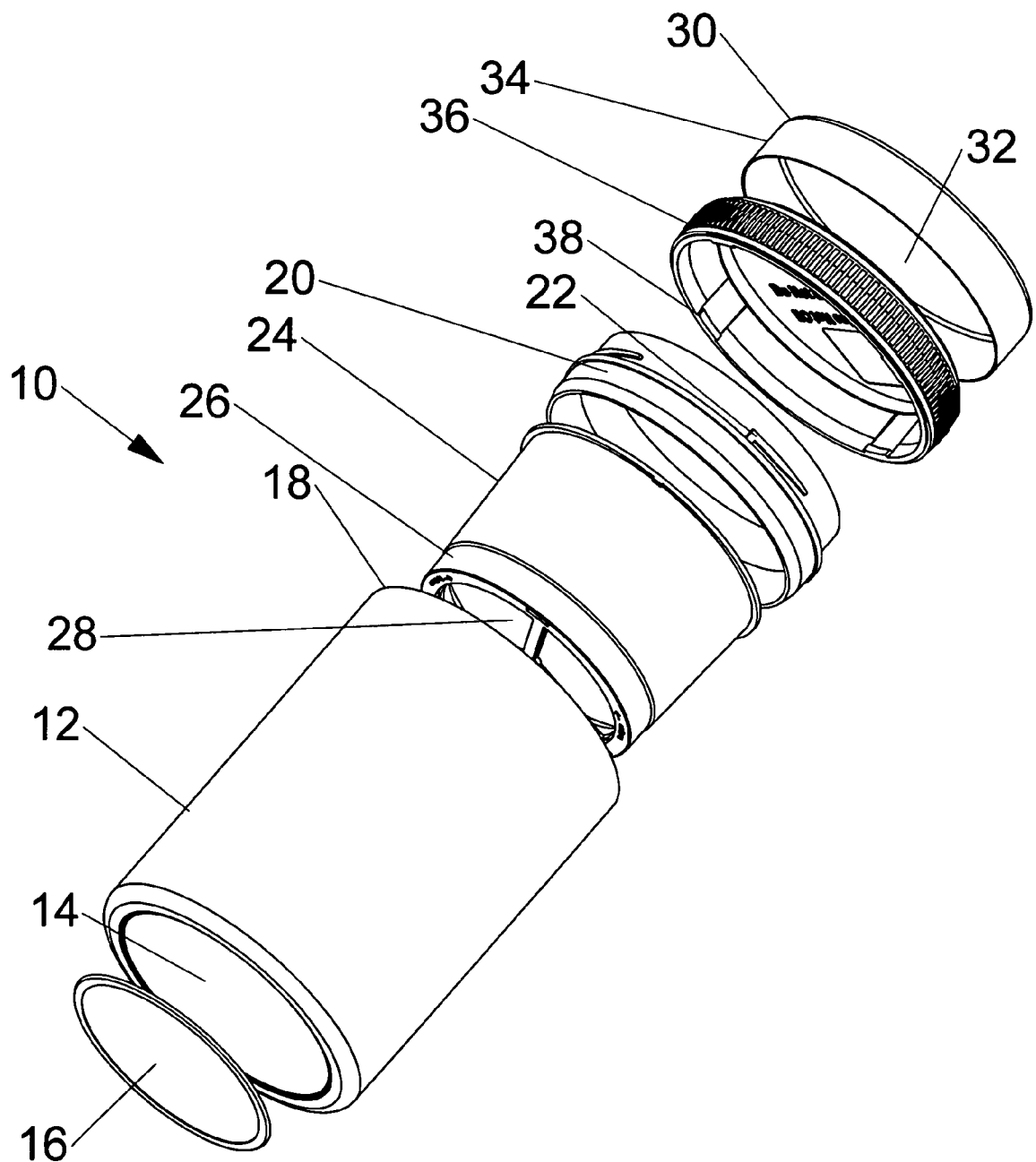
FIG. 2 is an exploded view of the container shown in FIG. 1.
Figure 3:
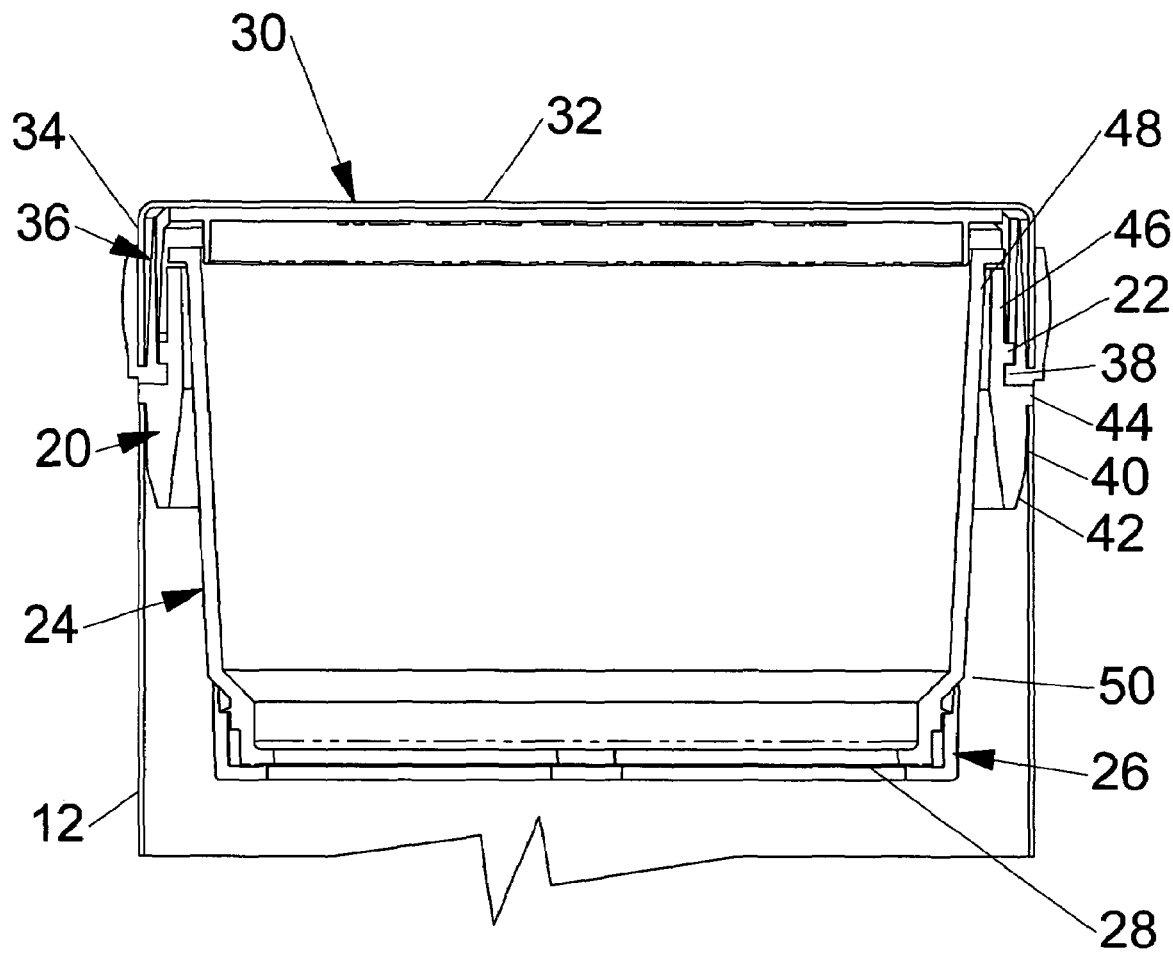
FIG. 3 is a cross-sectional view of the container shown in FIG. 1.

Referring to FIGS. 1, 2, and 3, a container 10 in accordance with the present embodiment includes a tubular canister body 12 having a planar bottom surface 14 that closes the lower end of the canister body 12. Preferably, the canister body 12 is made of a suitable attractive metal such as stainless steel. Attached to the bottom surface of the planar bottom 14 is a circular skid pad 16 made of a suitable material such as elastomer. Fitted into the circular upper rim 18 of the canister body 12 is an annular plastic canister insert 20 having male threads 22 and slideably received through the central opening of the canister insert 20 an into the center of the canister body 12 is a generally tubular filter cup 24. Attached to the bottom end of the filter cup 24 is an annular filter retainer 26 for retaining a thin planar circular filter 28 to the bottom end of the filter cup 24. The container 10 further includes a lid 30 having a planar upper surface 32 and a tubular downwardly extending annular flange 34. Preferably the lid 30 is made of the same metal, or stainless steel, as the canister body 12. An annular lid insert 36 has tubular inner and outer portions that fit around the tubular flange 34 of the lid 30 and includes female threads 38 on the inner surface thereof for retaining the lid 30 to the threads 22 of the canister insert 20.

The oil canister is depicted in FIGS. 1 and 3 with the bottom surface 14 horizontally oriented so as to sit on the surface of a table or counter and the axes of the tubular canister body 12 extending vertically and the lid 30 at the upper end, as the canister would normally be positioned while retaining cooking oil. For the purposes of this discussion, the various parts will be described as having upper portions or surfaces that are oriented in an upward direction when the canister is viewed as shown in FIGS. 1 and 3, and as having lower portions or surfaces which are directly downwardly when the canister is viewed as shown in FIGS. 1 and 3.

Figure 7:
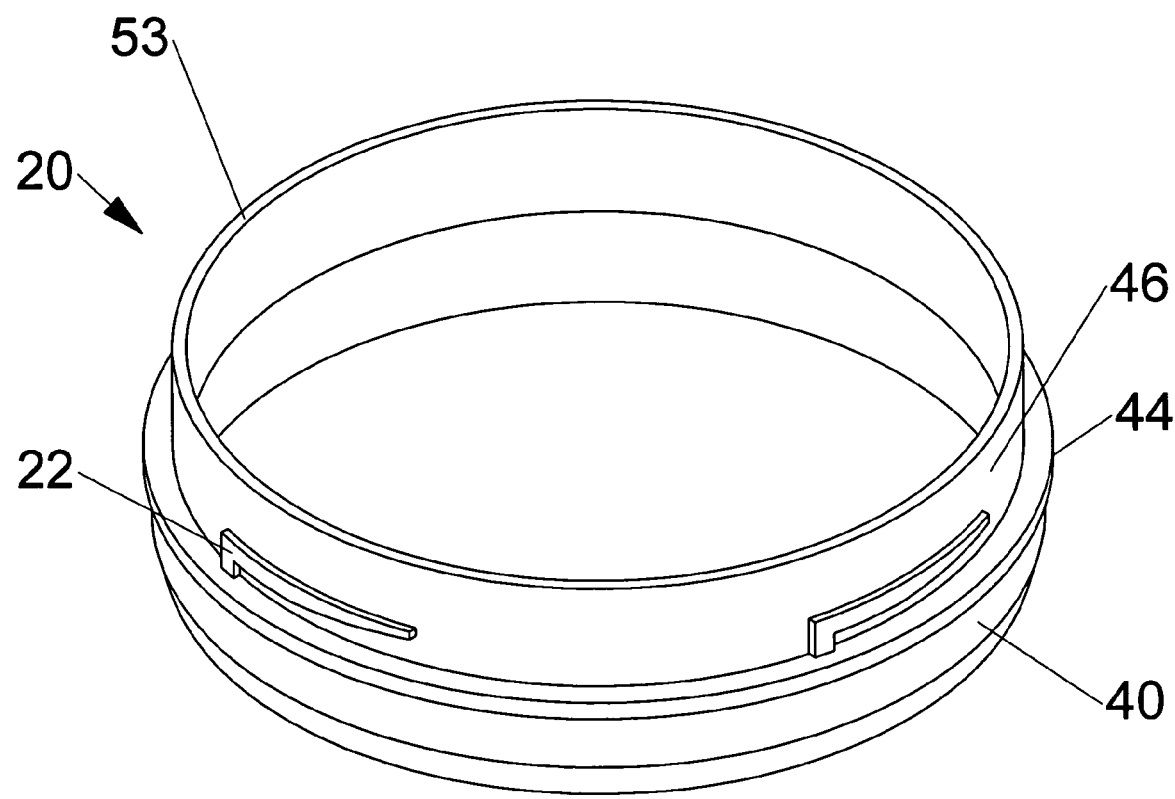
FIG. 7 is an enlarged isometric view of the canister insert for the upper end of the container shown in FIG. 1.
Figure 8:
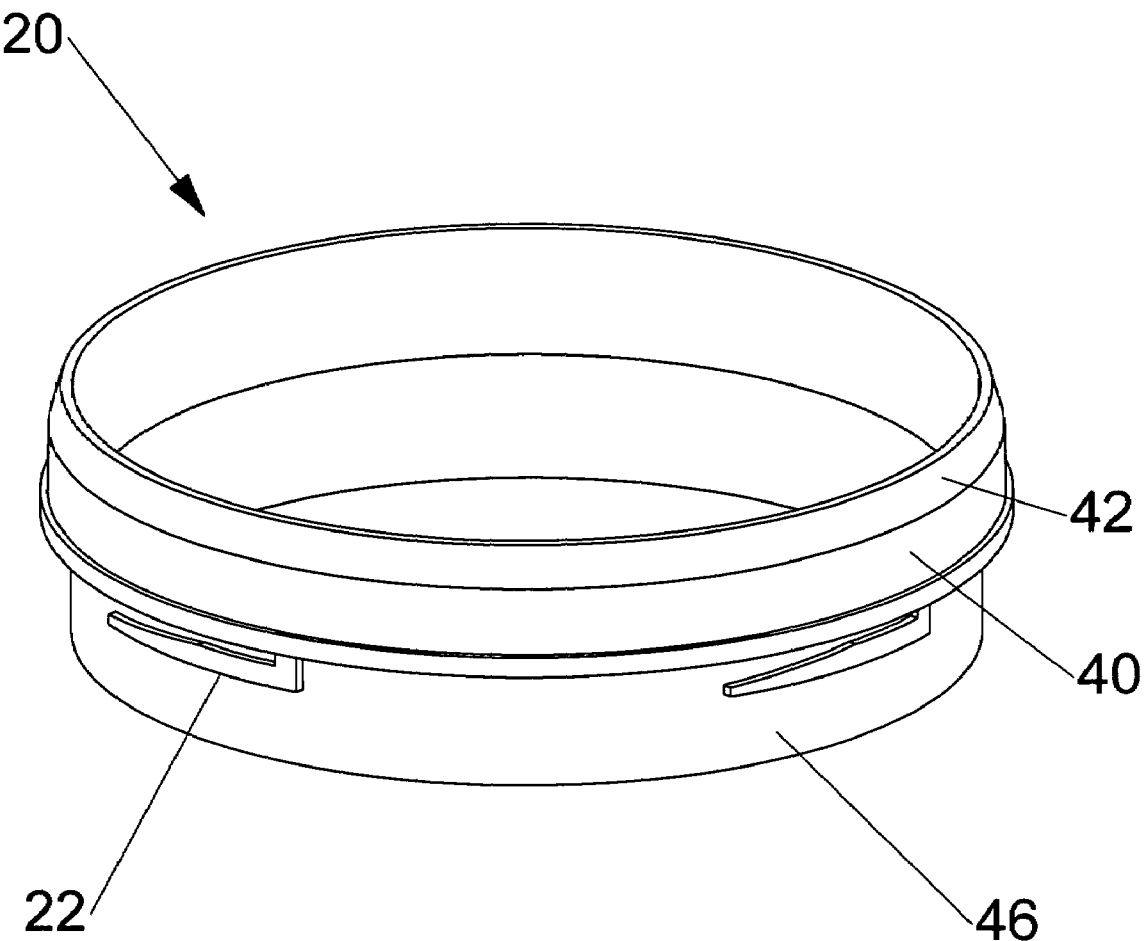
FIG. 8 is a second isometric view of the canister insert shown in FIG. 7.
Figure 9:
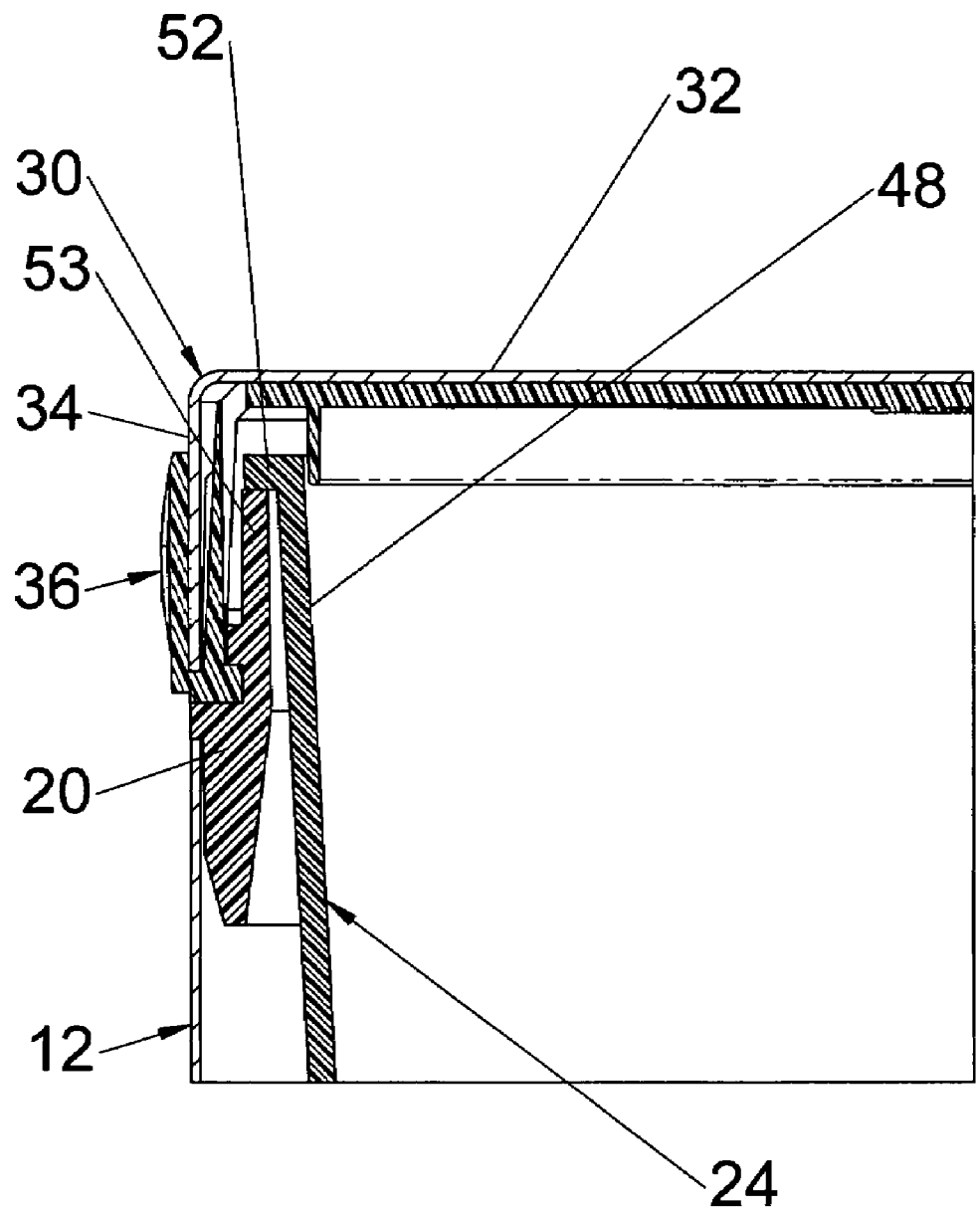
FIG. 9 is a fragmentary enlarged cross-sectional view of the upper end of the filter cup shown in FIG. 4 fitted into the canister insert shown in FIG. 7 and the cover attached thereto.

Referring to FIGS. 3, 7, and 8, the canister insert 20 has a cylindrical outer surface 40, the diameter of which is a little larger than the inner diameter of the canister body 12 such that the cylindrical surface 40 will tightly fit within the cylindrical wall of the canister body 12. A frustoconical surface 42 immediately below the cylindrical surface 40 tapers the lower end of the cylindrical surface 40 radially inwardly to facilitate the insertion of the cylindrical surface 40 into rim 18 of the canister body 12. The insert is therefore press fitted into the canister body 12 so that it can be easily disassembled for cleaning. Above the cylindrical surface 40 of the insert 20 is an annular ridge 44 forming a downwardly directed shoulder that engages the rim 18 of the canister body 12 to retain the insert 20 from sliding further into the canister body 12. Extending upwardly of the annular ridge 44 is a reduced diameter tubular portion 46, the outer surface of which bears the male threads 22 for engaging the female threads 38 of the lid insert 36.

Referring to FIGS. 4, 7, 9, and 10, the filter cup 24 is generally frustoconical in shape with a very gentle taper from the larger diameter upper end 48 to the smaller diameter lower end 50. A radial flange 52 around the circumference of the upper end 48 has a diameter sufficiently large for the flange 52 to engage the upper surface 53 of the tubular upper portion 46 of the canister insert 20 to prevent the filter cup 24 from sliding into the canister body 12. Immediately below the radial flange 52, the upper end 48 of the filter cup has a diameter that is a little less than the inner diameter of the canister insert 20 to allow a space between the inner wall of the insert 20 and the outer wall of the filter cup 24 for air to escape. A plurality of downwardly extending projections 54 extend around the downwardly directed shoulder formed by the radial flange 52 to space the flange 52 from the upper surface 53 of the tubular portion 46 of the insert 20. The spacing between the cylindrical inner surface of the insert 20 and the outer wall of the filter cup 24 and the spaces between the shoulder of the radial flange 52 and the upper surface 53 of the tubular portion 46 of the insert 20 allow air from inside the canister body 12 to escape as liquid oil in the filter cup 24 drains through the filter 28 and into the canister body 12.

Figure 4:
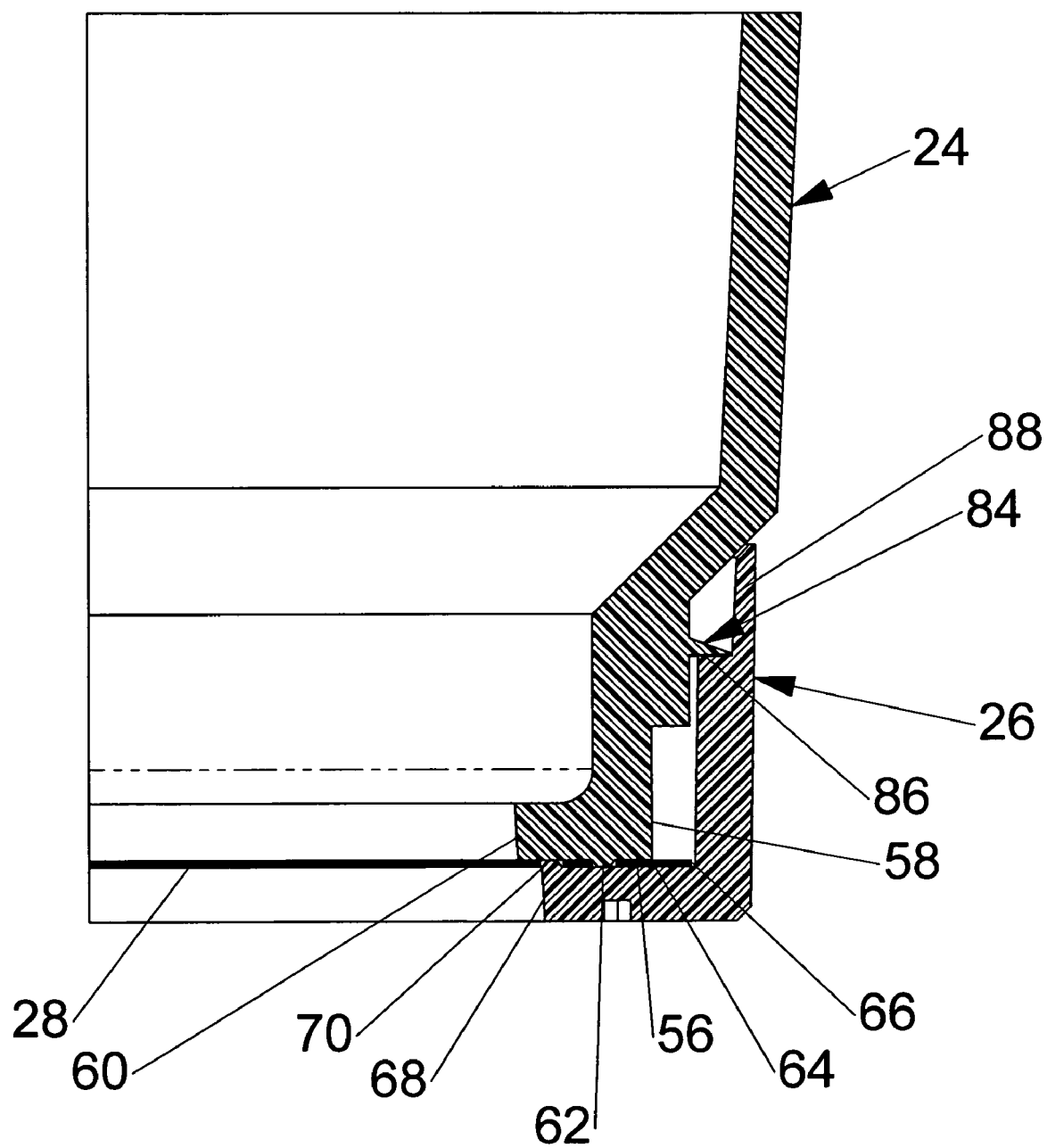
FIG. 4 is an enlarged fragmentary cross-sectional view of the filter cup, filter, and filter retainer for the container shown in FIG. 1.

Referring to FIGS. 3, 4, 10, and 11, the filter cup 24 retains the generally planar filter 28 against an annular lower surface 56 which extends between an annular outer edge 58 and an annular inner edge 60. Between the annular inner and outer edges 58, 60, the lower surface 56 is planar with the exception of an annular downwardly extending ridge 62. The filter 28 is retained against the annular surface 56 by the filter retainer 26 which has a complementary shaped upwardly directed annular surface 64 having an outer edge 66 with a diameter greater than the diameter of the outer edge 58 of the filter cup and an inner edge 68 having a diameter generally equal to the diameter of the inner edge 60 of the filter cup with the annular surface 64 extending generally planar between the inner and outer edges 66, 68 except for an upwardly directed annular ridge 70. As best seen in FIG. 4, the downwardly directed annular ridge 62 of the filter cup 24 has a diameter that is different than the diameter of the upwardly directed annular ridge 70 of the filter retainer 26 thereby creating an undulating surface between the ridges 62, 70 for tightly retaining the outer ends of the circular filter 28.

Figure 10:
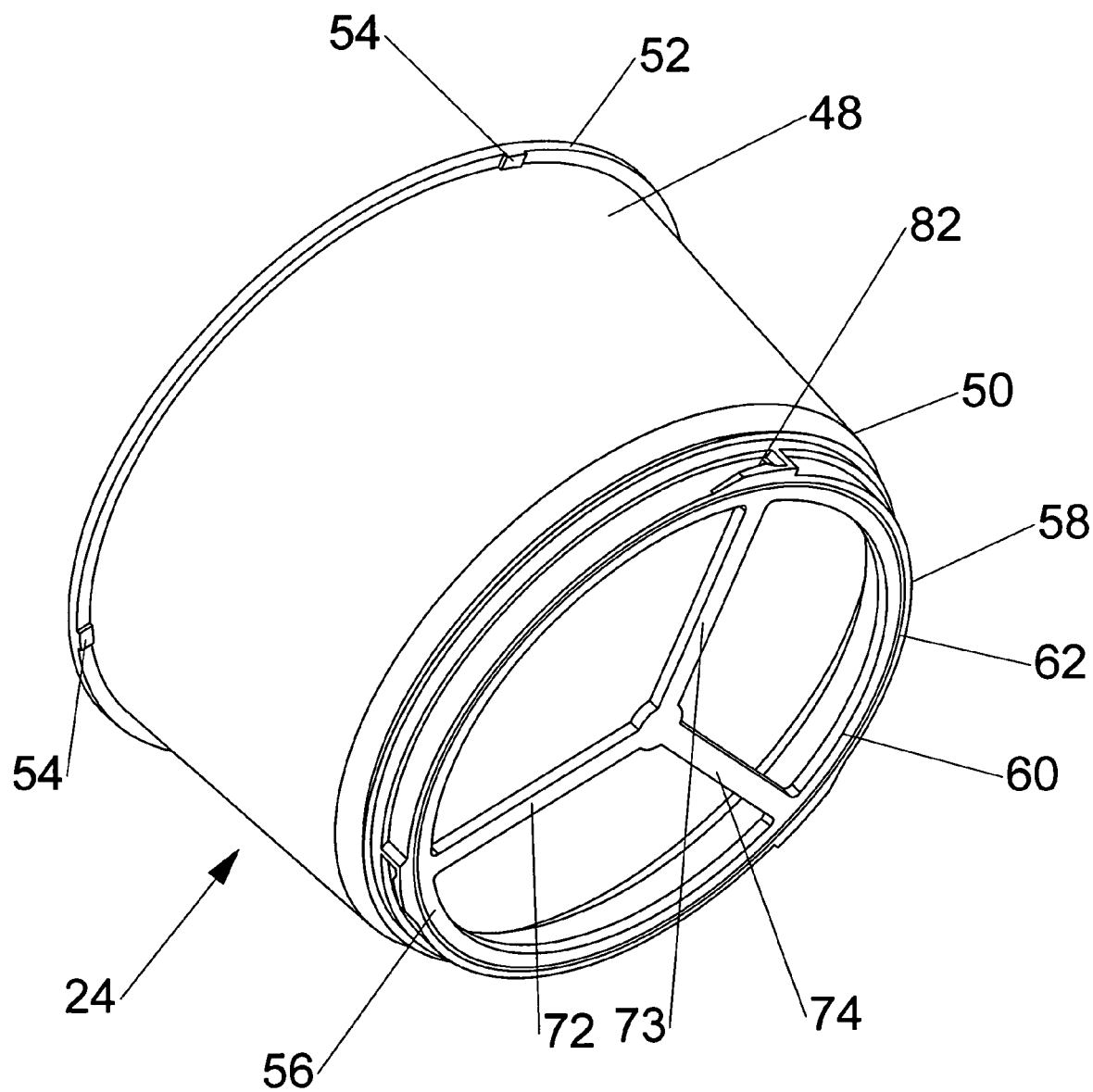
FIG. 10 is an isometric view of the filter cup shown in FIG. 4 depicting the bottom portion thereof.
Figure 11:
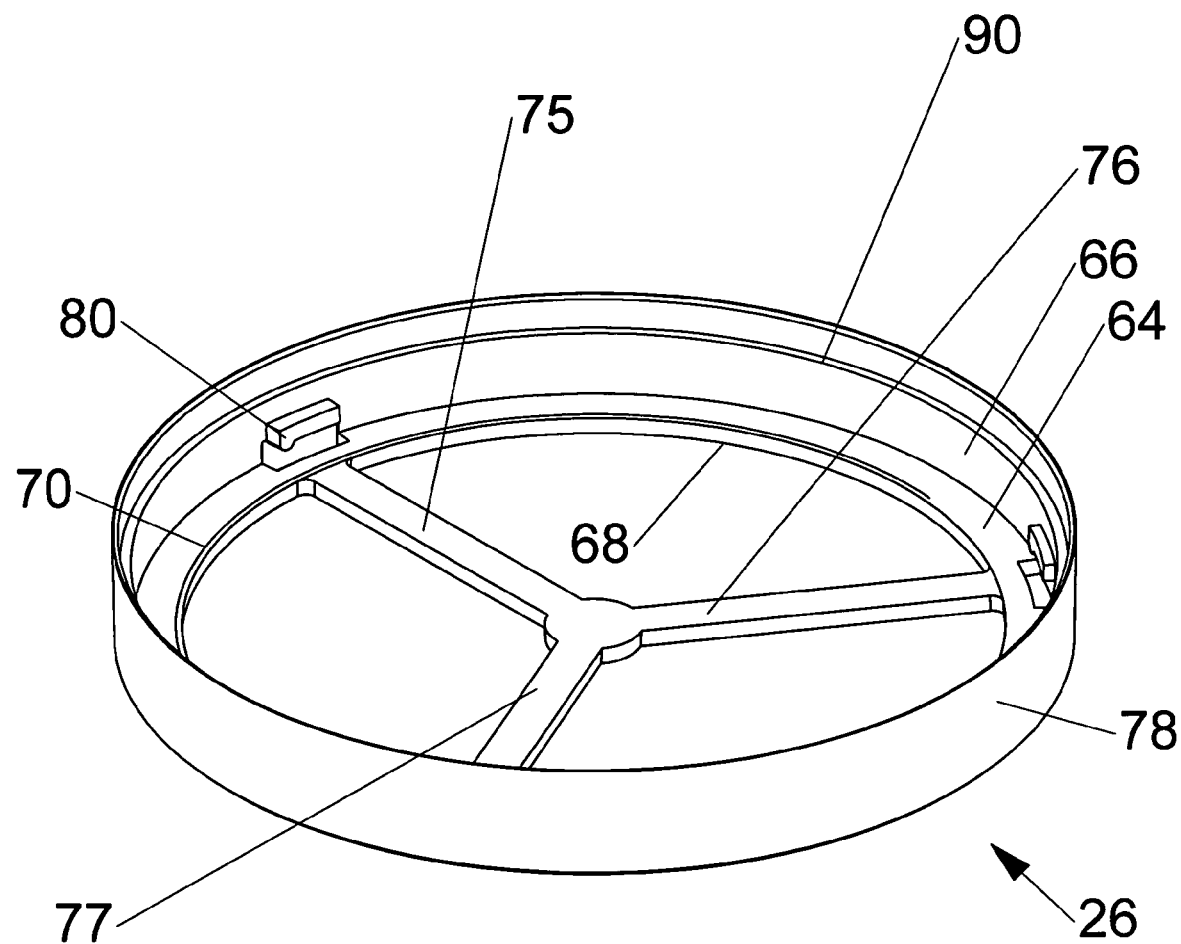
FIG. 11 is an isometric view of the filter retainer for attachment to the filter cup shown in FIG. 10.
Figure 12:
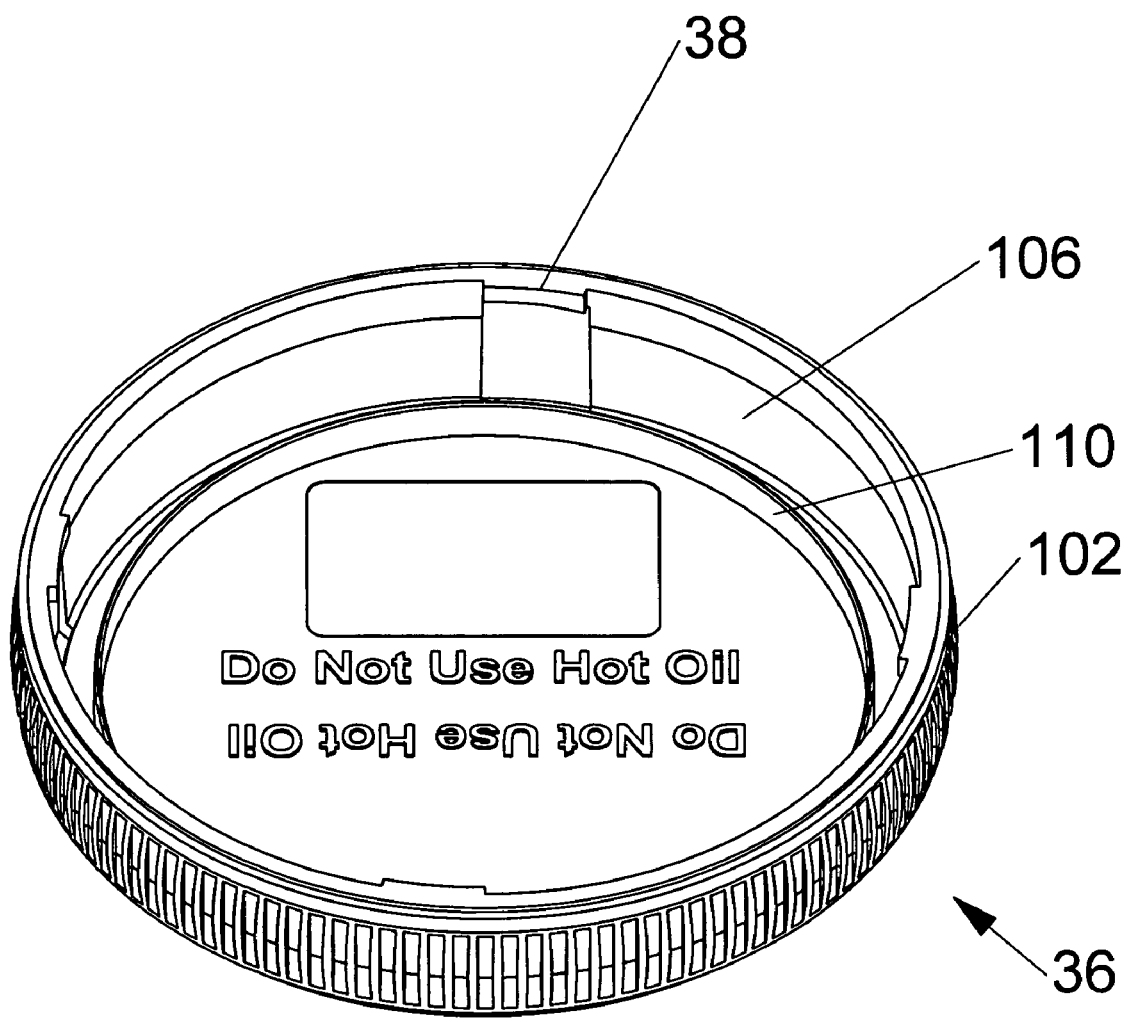
FIG. 12 is an isometric view of the lid insert for the canister lid shown in FIGS. 1 and 2.

Referring to FIGS. 10 and 11, the filter cup 24 also has a plurality of spokes 72, 73, 74, that extend across the lower end thereof and a second plurality of spokes 75, 76, 77 extend across the central opening of the filter retainer 26 for providing support to the flexible filter 28 as it is retained between the parts. The filter retainer 26 has a cylindrical upwardly directed tubular flange 78 having female threadings 80 that engage one-eighth turn male threadings 82 around the lower end 50 of the filter cup 24 to retain the parts together and thereby retain the filter 28 between the bottom surface 56 of the filter cup 24 and the upper surface 64 of the filter retainer 26. Preferably, the one-eighth turn threads 80, 82 are positioned such that when the threads are engaged, the spokes 75-77 of the filter retainer are aligned with the spokes 72-74 of the filter cup.

Referring to FIGS. 4, 10, and 11, another feature of the filter cup 24 and filter retainer 26 is the provision of a seal that prevents liquid oil in the filter cup 24 from overflowing the threads 80, 82 and thereby avoiding the filter 28. As best shown in FIG. 4, extending radially outward around the lower end 50 of the filter cup is an integral annular flange 84 having a planar lower surface 86 and a frustoconical upper surface 88. Preferably, the filter cup 24 is made out of a plastic having a limited degree of flexibility such that a degree of flexibility exists in the integral tapered flange 84. The filter retainer 26 has a annular upwardly extending shoulder 90 around the upwardly extending flange 78 that engages the planar surface 76 of the flange 84 and compresses against the planar surface 86 as the threads 80 of the filter retainer 26 are tightened to the threads 82 of the filter cup thereby creating a seal between the parts.

Figure 5:
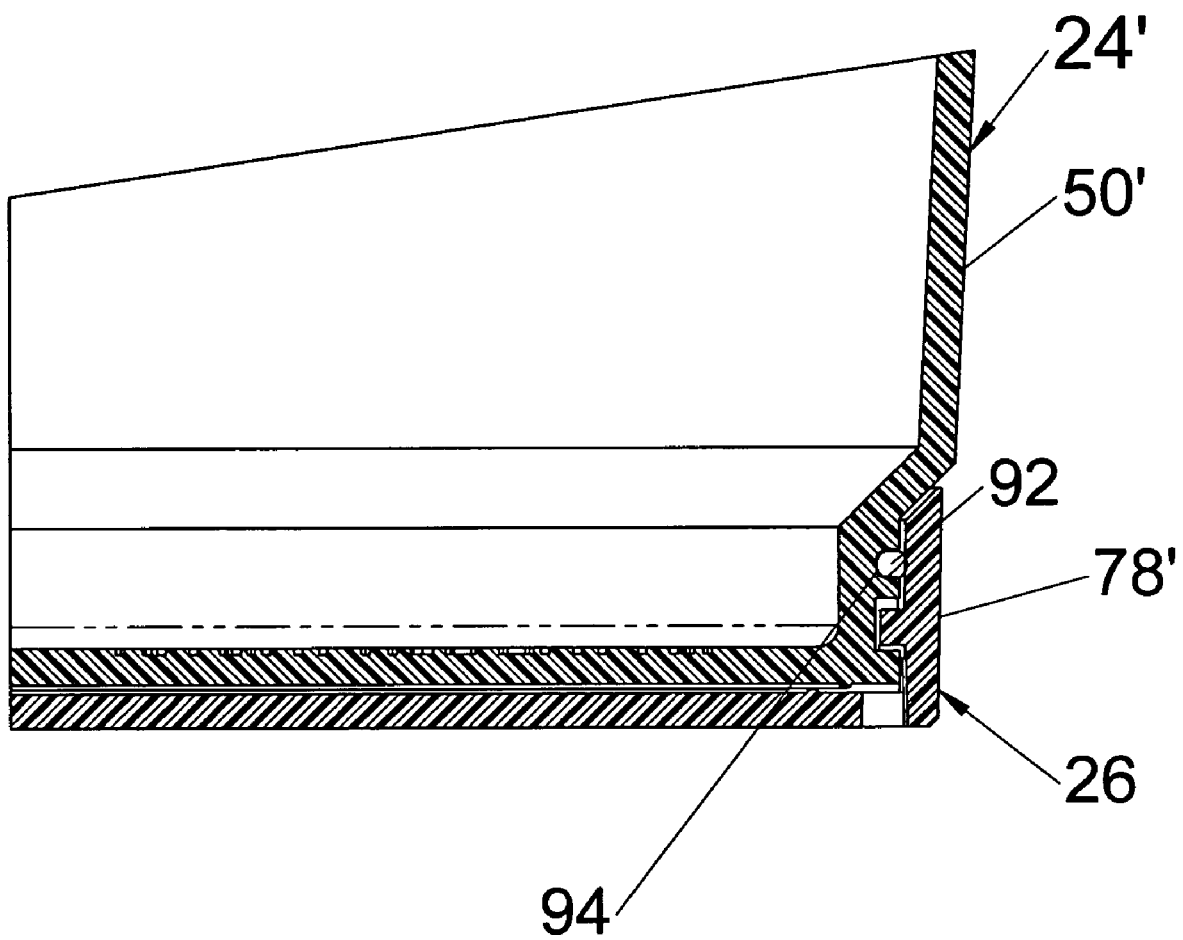
FIG. 5 is an enlarged cross-sectional view of a filter cup, filter, and retainer having a seal in accordance with the second embodiment of the invention.

Referring to FIG. 5, it should be appreciated that the seal between a filter cup 24' and a filter retainer 26' may take any of a number of embodiments, such as an O-ring 92 retained in an annular groove 94 that extends around the outer circumference of the lower end 50' of the filter cup 24' that is compressed against the inner surface of the upwardly extending annular flange 78' of the filter retainer 26'.

Figure 6:
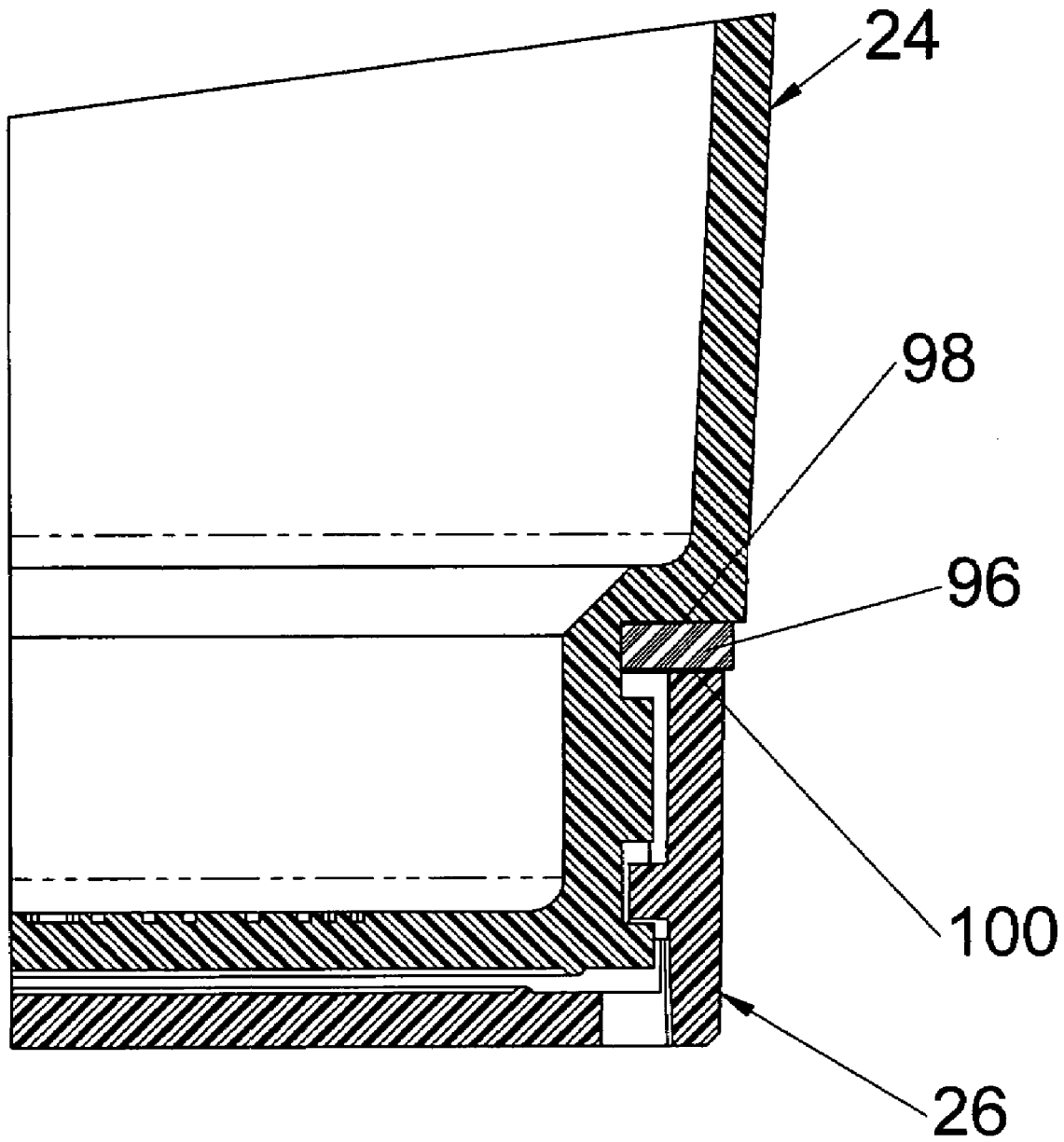
FIG. 6 is yet another enlarged cross-sectional view of the filter cup, filter, and retainer for the container shown in FIG. 1 having yet another embodiment of a seal between the parts.

Referring to FIG. 6, an annular gasket 96 having planar upper and lower surfaces may also be used to provide a seal where the upper and lower surfaces of the gasket 96 are retained between an annular lower shoulder 98 of a filter cup 24" and an annular upper rim 100 of a filter retainer 26".

Referring to FIGS. 2, 9, 12, and 13, the upper end of the canister 10 includes an attractive plastic lid insert 36 having a tubular outer portion 102 that includes an attractive grip surface that can be easily grasped by a user for removing the lid 30 from the container 10. The lid insert 36 also includes a tubular inner portion 106 having female threads 38 on the inner surface thereof that engage the threads 22 of the canister insert 20 for retaining the lid 30 to the canister body 12. The tubular inner portion 106 has an annular inner wall that defines a planar downwardly facing surface 110 having an inner diameter that is greater than the outer diameter of the lower end of the filter retainer 26 such that the filter cup 24 with the filter retainer 26 attached thereto can be rested upon the inner surface of the lid 30 and lid insert 36 when the lid is inverted on a horizontal surface 111 as depicted in FIG. 14. The lid 30 will therefore serve as a drip cup for collecting oil falling off the filter cap 24 while the user pores liquid oil out of the canister body 12.

Figure 13:
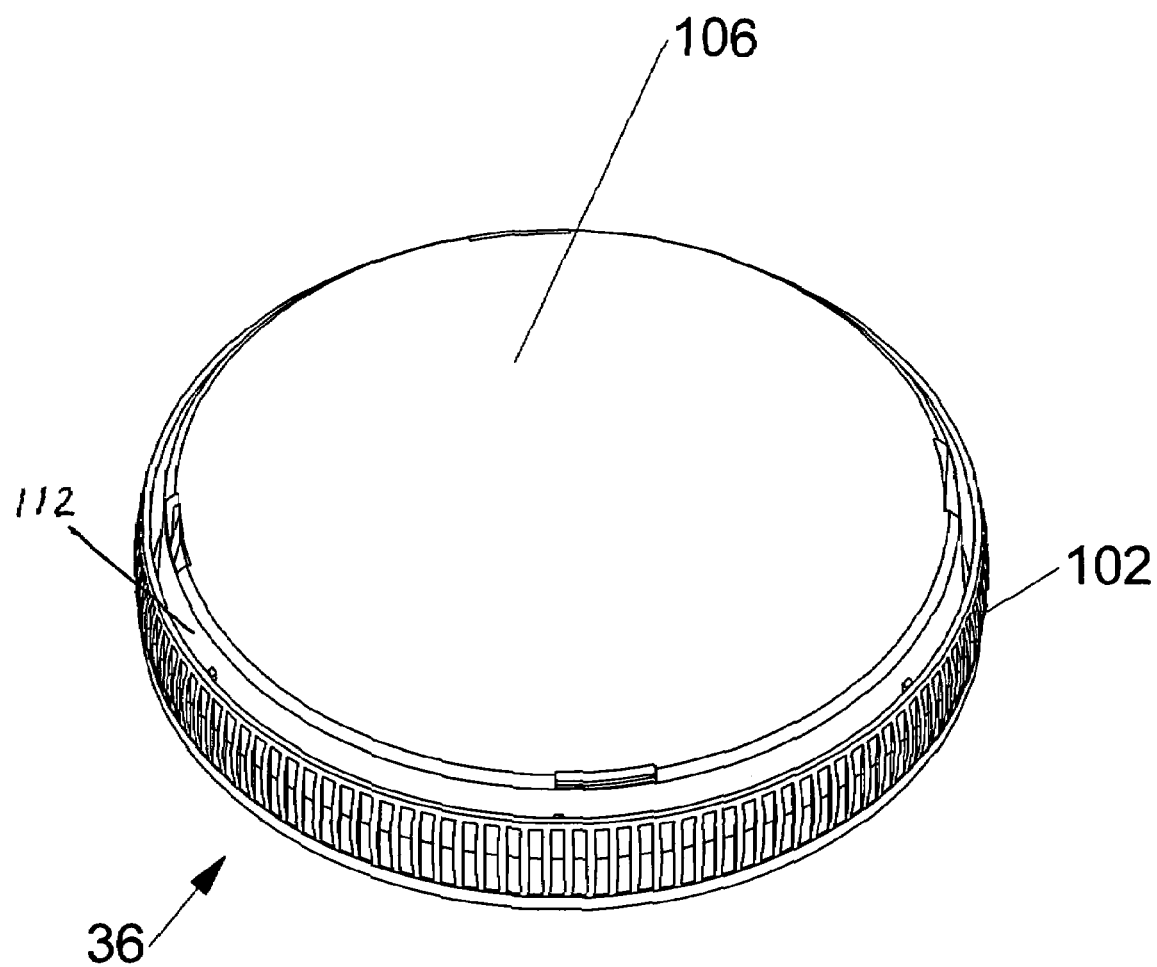
FIG. 13 is a second isometric view of the canister lid shown in FIG. 12.
Figure 14:
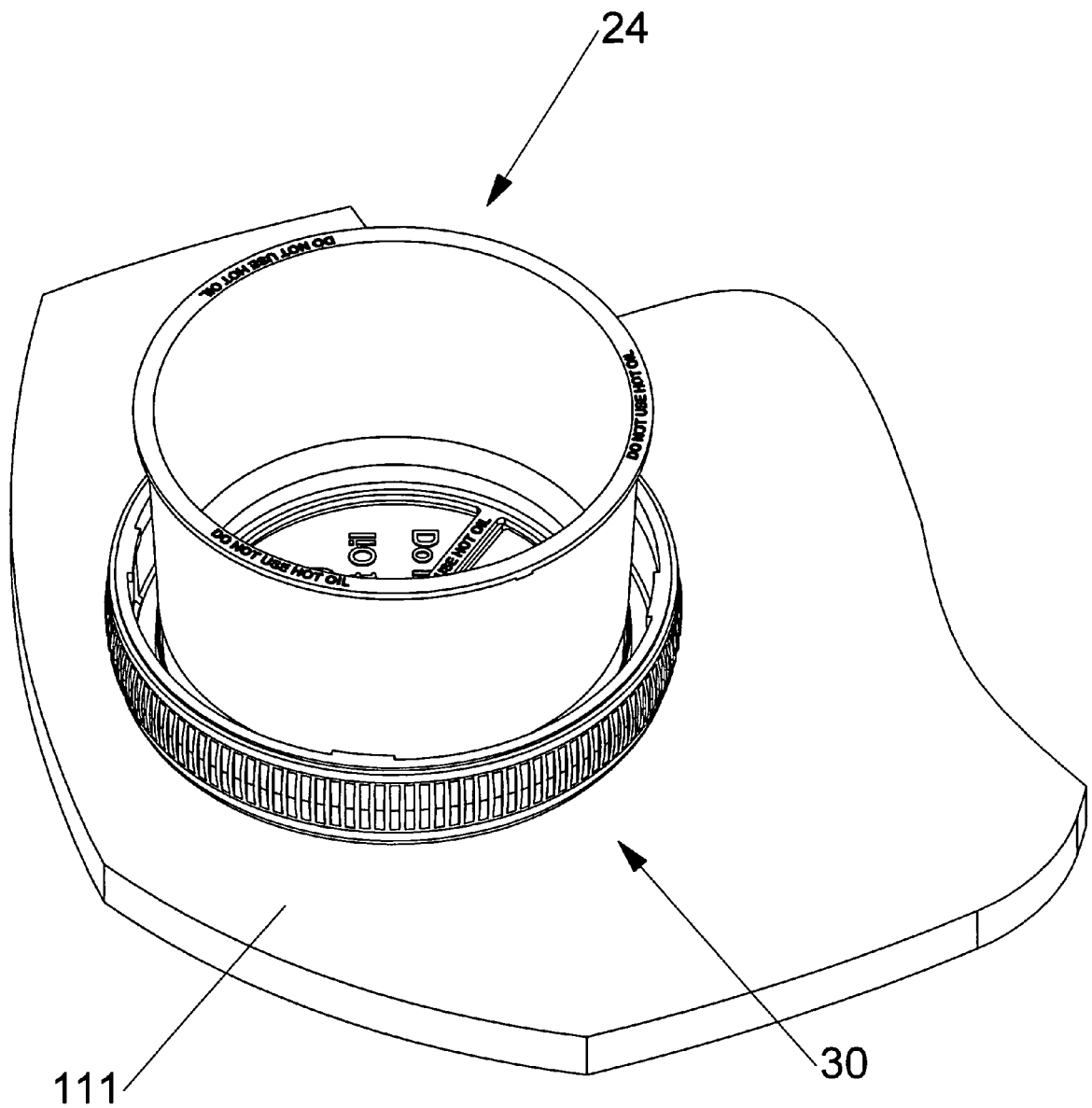
FIG. 14 is an isometric view showing the filter cup and retainer shown in FIG. 4 fitted on top of the inverted assembled lid as shown in FIG. 12 with the lid serving as a drip cup for the filter.

As best shown in FIG. 13, an annular gap 112 in the upper surface of the lid insert 36 separates the tubular inner portion 106 from the tubular outer portion 102. To assemble the lid 30 to the lid insert 36, the annular flange 34 of the lid 30 is pressed into annular gap 112 in the upper surface of the lid insert 36. The parts are retained together by friction and therefore they can be easily disassembled for cleaning. By molding the grip surface 102 and the female threads 38 as a single part 36, the number of parts is reduced and the cost of manufacture is also reduce.

As can be seen, the present invention is an attractively presented oil canister having a enclosed filter cup with a replaceable filter with the parts sealed and assembled so as to be readily useable by a chef in a kitchen. The canister, oil cup, and filter may be used to store vegetable oils for reuse, animal oils, such as bacon grease, or another reuseable liquid. Where the canister is to be used for vegetable oils, the container and the filter cup are preferably designed to contain more liquid than a container or filter cup designed to retain animal oils because greater quantities of vegetable oils than animal oils are used in cooking. Regardless of the use, the parts can be easily disassembled for periodic cleaning.

While the present invention has been depicted in a single embodiment, it will be appreciated that many modifications and variations may be made without departing from the spirit and scope of the invention. It is therefore the intent of the following claims to cover all such variations and modifications that fall within the true spirit and scope of the invention.

What is claimed:

1. A container for storing a liquid comprising
a tubular canister having a closed bottom,
a tubular filter cup having a threaded lower end received within said canister,
said lower end having an annular outer edge, a concentric annular inner edge and a downwardly facing planar surface extending between said inner edge and said outer edge,
an annular ridge on said downwardly facing planar surface spaced between said inner edge and said outer edge,
an annular filter retainer having an upwardly facing annular planar surface complementary to said planar surface of said filter cup and threads complementary to said threaded lower end of said filter cup,
a generally planar filter between said downwardly facing planar surface of said filter cup and said upwardly facing planar surface of said retainer,
said upwardly facing annular planar surface having an annular ridge thereon concentric with said annular ridge of said filter cup, and
said annular ridge on said upwardly facing planar surface having a diameter different from a diameter of said annular ridge on said downwardly facing surface wherein said annular ridge of said filter cup and said annular ridge of said retainer form an undulating surface for retaining an outer end of said filter.

2. The container of claim 1 and further comprising
a radially outwardly extending flange around an upper end of said filter cup for engaging an annular upper rim of said canister wherein said radial flange retains said filter cup at an upper end of said canister, and
a plurality of downwardly extending protrusions on an annular lower surface of said radial flange for contacting said annular upper rim and spacing said radial flange from said upper rim wherein air within an interior of said canister can escape between said upper rim and said radial flange as liquid in said filter cap passes through said filter and into said interior.

3. The container of claim 1 and further comprising
an annular compressible seal between said lower end of said filter cup and said filter retainer for preventing liquid above said filter from overflowing around an annular upper edge of said retainer.

4. The container of claim 1 wherein
said canister has a threaded upper end and said container further comprises
a cover having an upper planar surface and a tubular rim,
a plastic retainer sleeve for retaining said cover having a tubular inner portion for fitting within said tubular rim,
said tubular inner portion having threads for engaging said threads at said upper end of said canister,
said retaining sleeve further having a tubular outer portion forming a grip band around an outer circumference of said tubular rim, and
said tubular inner portion and said tubular outer portion made as a single part wherein said tubular rim is received in an annular groove between said inner and outer tubular portions.

5. The container of claim 1 wherein
said canister has a threaded upper end and said container further comprises
a cover having threads complementary to said threads at said upper end of said canister,
said cover having a planar inner surface and a planar outer surface, and
an annular ridge around said inner surface, and
said annular ridge having an inner diameter greater than an outer diameter of a lower end of said filter retainer wherein said annular ridge will center said filter cup and said filter retainer on said cover inner surface while said cover is inverted and resting on a horizontal surface.

6. The container of claim 1 wherein
said canister has a threaded upper end and said container further comprises
a cover having an upper surface and a tubular rim,
a sleeve for retaining said cover, said sleeve having a tubular inner portion for fitting within said tubular rim and a tubular outer portion for fitting around outer surface of said tubular rim,
said tubular inner portion having threads for engaging said threads at said upper end of said canister,
a tubular outer portion forming a grip band around a circumference of said tubular outer portions,
said tubular inner portion and said tubular outer portion of said sleeve made as a single part wherein said tubular rim is received in an annular groove between said inner and outer tubular portions,
a radially outwardly extending flange around an upper end of said filter cup for engaging an annular upper rim of said canister wherein said radial flange retains said filter cup at an upper end of said canister,
a plurality of downwardly extending protrusions on an annular lower surface of said radial flange for contacting said radially outwardly extending flange and for spacing said radial flange from said upper rim,
an annular compressible seal between said lower end of said filter cup and said filter retainer for preventing liquid above said filter from overflowing around an annular upper edge of said retainer,
said cover having threads complementary to said threads at said upper end of said canister, and
said tubular rim of said cover having an inner diameter greater than an outer diameter of a lower end of said filter retainer wherein said tubular rim will center said filter cup and said filter retainer on said cover inner surface while said cover is inverted and resting on a horizontal surface.

7. A container for storing a liquid comprising
a tubular canister having a closed bottom and a threaded upper end,
a tubular filter cup having a threaded lower end received within said canister,
an annular filter retainer having threads complementary to said threaded lower end of said filter cup,
a filter between said filter cup and said retainer,
a cover having threads complementary to said threads at said upper end of said canister,
said cover having a planar inner surface and a planar outer surface, and
an annular ridge around said inner surface, and
said annular ridge having an inner diameter greater than an outer diameter of a lower end of said filter retainer wherein said annular ridge will center said filter cup and said filter retainer on said cover inner surface while said cover is inverted and resting on a horizontal surface.

8. A container for storing a liquid comprising
a tubular canister having a closed bottom and a threaded upper end,
a tubular filter cup having a threaded lower end received within said canister,
an annular filter retainer having threads complementary to said threaded lower end of said filter cup,
a filter between said filter cup and said retainer,
a metallic cover having an upper surface and a tubular rim,
a plastic retaining sleeve for retaining said cover, said retaining sleeve having a tubular inner portion for fitting within said tubular rim,
said tubular inner portion having threads for engaging said threads at said upper end of said canister,
said retaining sleeve further having a tubular outer portion forming a grip band around an outer circumference of said tubular rim, and
said tubular inner portion and said tubular outer portion made as a single part wherein said tubular rim is received in an annular groove between said inner and outer tubular portions.

* * * * *